(12) United States Patent
Kim et al.

(10) Patent No.: US 11,815,909 B2
(45) Date of Patent: Nov. 14, 2023

(54) SYSTEM FOR AND METHOD OF CONTROLLING DRIVING OF AUTOMATED GUIDED VEHICLE

(71) Applicants: Samsung Display Co., Ltd., Yongin-si (KR); Postech Research And Business Development Foundation, Pohang-si (KR)

(72) Inventors: Yonggu Kim, Yongin-si (KR); Byung-In Kim, Pohang-si (KR); Minsu Kwon, Yongin-si (KR); Inhye Bang, Pohang-si (KR)

(73) Assignees: Samsung Display Co., Ltd., Yongin-si (KR); Postech Research and Business Development Foundation, Pohang-si (KR)

( * ) Notice: Subject to any disclaimer, the term of this patent is extended or adjusted under 35 U.S.C. 154(b) by 91 days.

(21) Appl. No.: 17/446,693

(22) Filed: Sep. 1, 2021

(65) Prior Publication Data

US 2022/0229444 A1 Jul. 21, 2022

(30) Foreign Application Priority Data

Jan. 18, 2021 (KR) .................. 10-2021-0006810

(51) Int. Cl.
*G05D 1/02* (2020.01)
*G07C 5/00* (2006.01)
(Continued)

(52) U.S. Cl.
CPC ..... *G05D 1/0287* (2013.01); *G06Q 10/06313* (2013.01); *G07C 5/008* (2013.01);
(Continued)

(58) Field of Classification Search
CPC ......... G05D 1/0287; G05D 2201/0216; G05D 1/0297; G05D 1/0295; G05D 1/0291;
(Continued)

(56) References Cited

U.S. PATENT DOCUMENTS 8,731,697 B2    5/2014  Park
2018/0032955 A1  2/2018  Lindawati

FOREIGN PATENT DOCUMENTS

CN    108873833 A  * 11/2018  ....... G05B 19/41895
CN    111208815 A  *  5/2020
(Continued)

OTHER PUBLICATIONS

Byung-In Kim et al., "Effectiveness of vehicle reassignment in a large-scale overhead hoist transport system", International Journal of Production Research, Feb. 15, 2007, pp. 789-802, vol. 45, No. 4, Taylor & Francis, London, UK.

*Primary Examiner* — Anne Marie Antonucci
*Assistant Examiner* — Jewel Ashley Kuntz
(74) *Attorney, Agent, or Firm* — Lewis Roca Rothgerber Christie LLP (57) ABSTRACT

A method of controlling driving of a first automated guided vehicle and a second automated guided vehicle includes: determining a first task exchange condition based on a current position of the second automated guided vehicle, a current position of the first automated guided vehicle, a first task position, and a second task position; determining a second task exchange condition based on a first estimation time taken for the first automated guided vehicle to complete a first task and a second estimation time taken for the second automated guided vehicle to move to the first task position; and when the first task exchange condition and the second task exchange condition are satisfied, exchanging the first task with the second task.

18 Claims, 8 Drawing Sheets

(51) Int. Cl.
   *G06Q 10/0631* (2023.01)
   *G06Q 50/04* (2012.01)
   *B60W 60/00* (2020.01)
   *G06Q 50/28* (2012.01)

(52) U.S. Cl.
   CPC . *B60W 60/0025* (2020.02); *G05D 2201/0216* (2013.01); *G06Q 50/04* (2013.01); *G06Q 50/28* (2013.01)

(58) Field of Classification Search
   CPC .. G05D 1/0027; G05D 1/0212; G05D 1/0268; G06Q 10/06313; G06Q 50/04; G06Q 50/28; G07C 5/008; G07C 5/02; B60W 60/0025
   See application file for complete search history.

(56) References Cited

FOREIGN PATENT DOCUMENTS

| | | |
|---|---|---|
| KR | 10-0389076 B1 | 6/2003 |
| KR | 10-0729707 B1 | 6/2007 |
| KR | 10-1287528 B1 | 7/2013 |
| KR | 10-1440612 B1 | 9/2014 |
| KR | 10-1740529 B1 | 5/2017 |
| KR | 10-2020-0065151 A | 6/2020 |

\* cited by examiner

SYSTEM FOR AND METHOD OF CONTROLLING DRIVING OF AUTOMATED GUIDED VEHICLE

CROSS-REFERENCE TO RELATED APPLICATION

The present application claims priority to and the benefit of Korean Patent Application No. 10-2021-0006810, filed on Jan. 18, 2021, in the Korean Intellectual Property Office, the entire disclosure of which is incorporated herein by reference.

BACKGROUND

1. Field

Aspects of one or more embodiments relate to a system and method for controlling driving of an automated guided vehicle.

2. Description of the Related Art

With the automation of production sites due to technological developments, material handling equipment may be used in many areas of the production site, and a production system may be desired to meet the increases in productivity and various consumer demands. Production systems may include fixed production systems, flexible production systems, and reconfigurable manufacturing systems (RMSs). Because the performance of these systems may depend on the flexibility of a material handling system, a material handling system that may satisfy both the flexibility and efficiency requirements of a production system at the same time may be desired. As a material handling system that may meet the flexibility and efficiency requirements at the same time, an automated guided vehicle (AGV) system may be utilized.

Automated guided vehicle systems suitable for transporting various materials to various loading and unloading points may influence the overall performance of production systems, and thus, they may be used in places where there are many demands for moving materials such as distribution warehouses and container terminals. Accordingly, their range of uses has gradually increased.

The above information disclosed in this Background section is only for enhancement of understanding of the background and therefore the information discussed in this Background section does not necessarily constitute prior art.

SUMMARY

Aspects of one or more embodiments include a system and a method of controlling driving of an automated guided vehicle, in which a driving waiting time of the automated guided vehicle may be reduced.

Aspects of embodiments according to the present disclosure are not limited to the technical characteristics mentioned above, and other technical characteristics that are not mentioned will be more clearly understood by those of ordinary skill in the art from the description of embodiments according to the present disclosure.

Additional aspects will be set forth in part in the description which follows and, in part, will be more apparent from the description, or may be learned by practice of the presented embodiments of the disclosure.

According to one or more embodiments, a method of controlling driving of a first automated guided vehicle and a second automated guided vehicle each operating in a workplace includes obtaining a current position and a current state of each of the first automated guided vehicle and the second automated guided vehicle, determining whether the current state of the first automated guided vehicle is a state of moving to a first task position to perform a first task and whether the current state of the second automated guided vehicle is a state of moving to a second task position to perform a second task, determining a first task exchange condition based on the current position of the second automated guided vehicle, the current position of the first automated guided vehicle, the first task position, and the second task position, determining a second task exchange condition based on a first estimation time taken for the first automated guided vehicle to complete the first task and a second estimation time taken for the second automated guided vehicle to move to the first task position, and in response to the first task exchange condition and the second task exchange condition being satisfied, exchanging the first task of the first automated guided vehicle with the second task of the second automated guided vehicle.

According to some embodiments, the first task exchange condition may be configured in an order of the current position of the second automated guided vehicle, the current position of the first automated guided vehicle, the first task position, and the second task position on a first path.

According to some embodiments, in the second task exchange condition, the first estimation time may be greater than the second estimation time.

According to some embodiments, the first estimation time may be a sum of a third estimation time taken for the first automated guided vehicle to move to the first task position and a fourth estimation time taken for the first automated guided vehicle to perform the first task.

According to some embodiments, the method may further include obtaining a current position of each of a plurality of automated guided vehicles operating in the workplace, and determining the first automated guided vehicle and the second automated guided vehicle from among the plurality of automated guided vehicles based on the current position of each of the plurality of automated guided vehicles.

According to some embodiments, the determining of the first automated guided vehicle and the second automated guided vehicle from among the plurality of automated guided vehicles may include determining the first automated guided vehicle, which is one of the plurality of automated guided vehicles, and determining one of the plurality of automated guided vehicles that is closest to the first automated guided vehicle, as the second automated guided vehicle based on the current position of each of the plurality of automated guided vehicles.

According to some embodiments, the method may further include sensing a third automated guided vehicle that is in an idle state from among the plurality of automated guided vehicles operating in the workplace and a current position of the third automated guided vehicle, exploring fourth automated guided vehicles that are in a state of moving to a task position to perform a task from among the plurality of automated guided vehicles, respectively calculating reassignment values respectively corresponding to the fourth automated guided vehicles based on the current position of the third automated guided vehicle and a current position and a task position of each of the fourth automated guided vehicles, determining a fifth automated guided vehicle from among the fourth automated guided vehicles based on the reassignment values, and assigning a third task that has been assigned to the fifth automated guided vehicle to the third automated guided vehicle, and switching the fifth automated guided vehicle to an idle state.

According to some embodiments, each of the reassignment values may be a difference between a first separation distance and a second separation distance, the first separation distance being between a task position and a current position of one of the fourth automated guided vehicles, and the second separation distance being between the task position of one of the fourth automated guided vehicles and the current position of the third automated guided vehicle.

According to some embodiments, the reassignment values may be positive numbers.

According to some embodiments, a reassignment value for the fifth automated guided vehicle among the reassignment values may correspond to a maximum value of the reassignment values.

According to some embodiments, the obtaining of the current position and the current state of each of the first automated guided vehicle and the second automated guided vehicle may be performed at a preset scanning period.

According to one or more embodiments, a system for controlling driving of automated guided vehicles, includes a first automated guided vehicle and a second automated guided vehicle each operating in a workplace, and a server configured to control driving of each of the first automated guided vehicle and the second automated guided vehicle, wherein the server is configured to obtain a current position and a current state of each of the first automated guided vehicle and the second automated guided vehicle, determine whether the current state of the first automated guided vehicle is a state of moving to a first task position to perform a first task and whether the current state of the second automated guided vehicle is a state of moving to a second task position to perform a second task, determine a first task exchange condition based on the current position of the second automated guided vehicle, the current position of the first automated guided vehicle, the first task position, and the second task position, determine a second task exchange condition based on a first estimation time taken for the first automated guided vehicle to complete the first task and a second estimation time taken for the second automated guided vehicle to move to the first task position, and when the first task exchange condition and the second task exchange condition are satisfied, exchange the first task of the first automated guided vehicle with the second task of the second automated guided vehicle.

According to some embodiments, the first task exchange condition may be configured in an order of the current position of the second automated guided vehicle, the current position of the first automated guided vehicle, the first task position, and the second task position on a first path.

According to some embodiments, the system may further include a plurality of nodes constituting the first path.

According to some embodiments, the system may further include a driving guidance line extending along the first path.

According to some embodiments, in the second task exchange condition, the first estimation time may be greater than the second estimation time.

According to some embodiments, the server may be configured to obtain a current position of each of the plurality of automated guided vehicles operating in the workplace, and determine the first automated guided vehicle and the second automated guided vehicle from among the plurality of automated guided vehicles based on the current position of each of the plurality of automated guided vehicles.

According to some embodiments, the server may be configured to sense a third automated guided vehicle that is in an idle state from among the plurality of automated guided vehicles operating in the workplace and a current position of the third automated guided vehicle, explore fourth automated guided vehicles that are in a state of moving to a task position to perform a task from among the plurality of automated guided vehicles, respectively calculate reassignment values respectively corresponding to the fourth automated guided vehicles based on the current position of the third automated guided vehicle and a current position and a task position of each of the four automated guided vehicles, determine a fifth automated guided vehicle from among the fourth automated guided vehicles based on the reassignment values, and assign a third task that has been assigned to the fifth automated guided vehicle to the third automated guided vehicle, and switch the fifth automated guided vehicle to an idle state.

According to some embodiments, each of the reassignment values may be a difference between a first separation distance and a second separation distance, the first separation distance being between a task position and a current position of one of the fourth automated guided vehicles, and the second separation distance being between the task position of one of the fourth automated guided vehicles and the current position of the third automated guided vehicle, and each of the reassignment values may be a positive number.

According to some embodiments, a reassignment value for the fifth automated guided vehicle among the reassignment values may correspond to a maximum value of the reassignment values.

These and/or other aspects will become apparent and more readily appreciated from the following description of the embodiments, the accompanying drawings, and claims.

These general and specific aspects may be implemented by using a system, a method, a computer program, or a combination of a certain system, method, and computer program.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Reference will now be made in more detail to aspects of some example embodiments, which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, aspects of some embodiments will be described with reference to the accompanying drawings, wherein like reference numerals refer to like elements throughout and a repeated description thereof is omitted.

While such terms as "first" and "second" may be used to describe various components, such components must not be limited to the above terms. The above terms are used to distinguish one component from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or components but do not preclude the addition of one or more other features or components.

It will be further understood that, when a layer, region, or component is referred to as being "on" another layer, region, or component, it can be directly or indirectly on the other layer, region, or component. That is, for example, intervening layers, regions, or components may be present.

Sizes of elements in the drawings may be exaggerated or reduced for convenience of explanation. For example, because sizes and thicknesses of elements in the drawings are arbitrarily illustrated for convenience of explanation, the disclosure is not limited thereto.

When an embodiment may be implemented differently, a certain process order may be performed differently from the described order. For example, two consecutively described processes may be performed substantially at the same time or performed in an order opposite to the described order.

In the present specification, "A and/or B" means A or B, or A and B. In the present specification, "at least one of A and B" means A or B, or A and B.

It will be understood that when a layer, region, or component is referred to as being "connected" to another layer, region, or component, it may be "directly connected" to the other layer, region, or component or may be "indirectly connected" to the other layer, region, or component with other layer, region, or component interposed therebetween. For example, it will be understood that when a layer, region, or component is referred to as being "electrically connected" to another layer, region, or component, it may be "directly electrically connected" to the other layer, region, or component or may be "indirectly electrically connected" to other layer, region, or component with other layer, region, or component interposed therebetween.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 1:
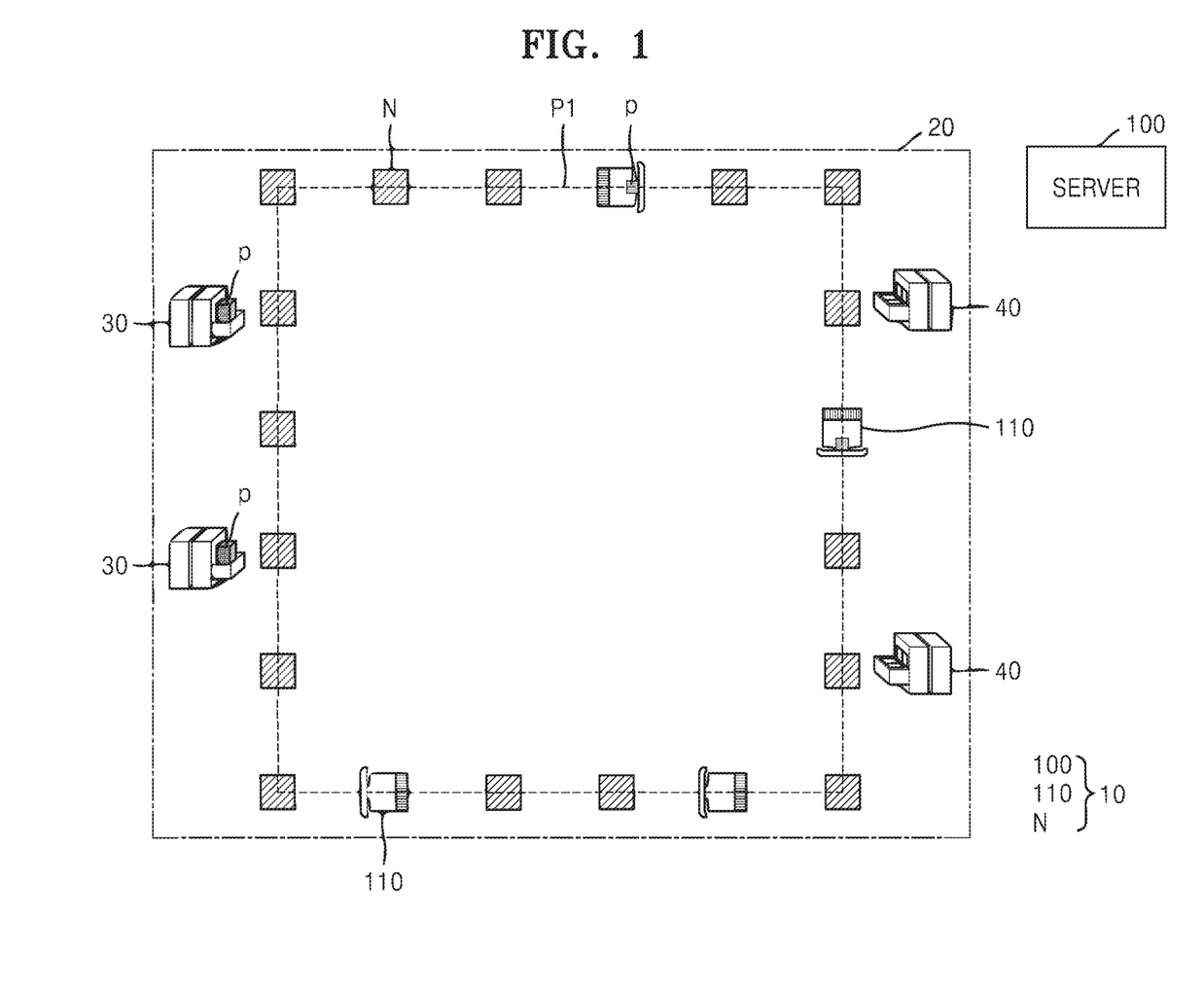
FIG. 1 is a view of an automated guided vehicle driving system according to some embodiments.
Figure 2:
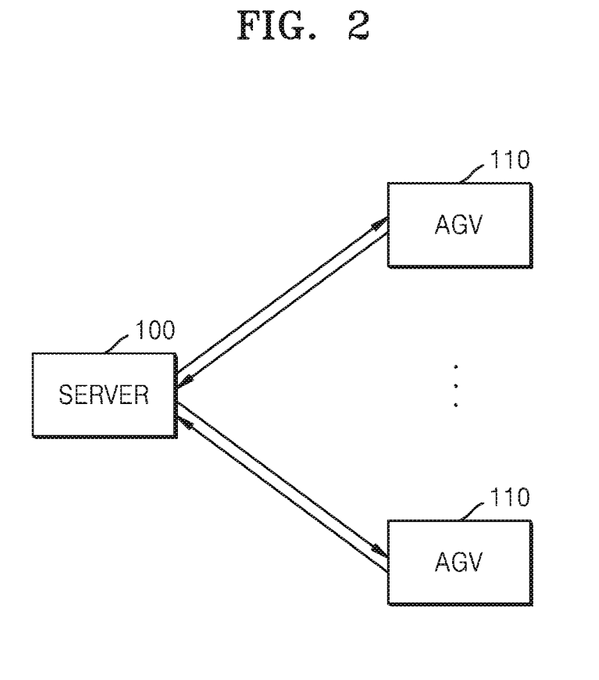
FIG. 2 is a block diagram showing a server and automated guided vehicles according to some embodiments.

FIG. 1 is a view of an automated guided vehicle driving system according to some embodiments. FIG. 2 is a block diagram of a server and automated guided vehicles according to some embodiments.

First, referring to FIG. 1, an automated guided vehicle driving system 10 may include automated guided vehicles (AGVs) 110, a server 100, and nodes N.

The AGVs 110 may each be a mobile robot that carries and loads/unloads a material p. The AGVs 110 may supply a material (e.g., a part) p inside a workplace 20. The AGVs 110 may be configured to be driven inside the workplace 20. As described below, the nodes N may be arranged inside the workplace 20. The AGVs 110 may be configured to be driven inside the workplace 20 in which the nodes N are arranged, and may recognize the nodes N. The AGVs 110 may be configured in various methods, arrangements, or configurations, such as a lower traction method of pallet (bogie), a forklift method, a mini-load method, and a front hook traction method.

The server 100 may be a control system configured to monitor and manage a movement status of the AGVs 110 operating inside a factory. The server 100 may control the driving of the AGVs 110.

According to some embodiments, as shown in FIG. 2, the server 100 may communicate with the AGVs 110 wirelessly. The server 100 may communicate with the AGVs 110 wirelessly through one or more suitable wireless communication technologies, according to the design of the automated guided vehicle driving system, such as wireless local area network (WiFi), single-hop, multi-hop, and Bluetooth. According to some embodiments, the automated guided vehicle driving system 10 may include a wireless relay configured to relay wireless communication between the server 100 and the AGVs 110. The wireless relay may constitute a wireless communication network and may be configured through various wireless communication technologies such as wireless local area network (WiFi), single-hop, multi-hop, and Bluetooth.

The server 100 may transmit codes including a task or driving information inside the workplace 20 to the AGVs 110 to control the driving of the AGVs 110. The server 100 may receive information regarding a current position, a current state, a driving velocity, a driving path, etc. of each of the AGVs 110 from the AGVs 110.

The nodes N may be arranged inside the workplace 20. Although it is shown in FIG. 1 that the nodes N are arranged on a first path P1, the nodes N may be omitted according to some embodiments. Additionally, the number of nodes N is not limited to the number of nodes illustrated in FIG. 1, and there may be any suitable number of nodes N according to the design of the automated guided vehicle driving system, the communication technologies implemented, and the size of the workplace 20. In addition, although only the first path P1 is shown inside the workplace 20 in FIG. 1, a plurality of paths may be further arranged inside the workplace 20 according to some embodiments. The nodes N may be arranged on the plurality of paths.

According to some embodiments, a quick response (QR) code may be attached to each of the nodes N. That is, the nodes N may be configured (or implemented) to be identified by a QR code. According to some embodiments, the nodes N may be identified through QR codes (e.g., unique QR codes corresponding to each node N), respectively. This is only an example, and according to various embodiments, the nodes N may be configured (or implemented) to be identified through a radio frequency identification (RFID) tag, a bar code, a beacon, or any other suitable identification mechanism.

According to some embodiments, the automated guided vehicle driving system 10 may include a driving guidance line that extends along the first path P1. In other words, the first path P1 may be configured (or implemented) through a driving guidance line. The driving guidance line may be, for example, a magnetic guideline. For example, according to some embodiments, the driving guidance line may be a magnetic tape. According to some embodiments, the driving guidance line may be a metallic material or layer extending along the first path P1, and may have magnetic properties to operate with corresponding magnetic components on an AGV 110. According to some embodiments, the driving guidance line may include aluminum (Al).

A loading station 30 at which the AGV 110 loads a material p, and an unloading station 40 at which the AGV 110 unloads a material p may be arranged inside the workplace 20.

As described below in FIGS. 3 and 4, the AGV 110 may perform a loading sub-task of loading a material p at the loading station 30, or perform an unloading sub-task of unloading a material p at the unloading station 40.

A first AGV of the AGVs 110 may be assigned a first loading sub-task and may move to a first task position to perform the first loading sub-task. A second AGV of the AGVs 110 may be assigned a second loading sub-task and may move to a second task position to perform the second loading sub-task.

In this case, the second AGV, the first AGV, the first task position, and the second task position may be positioned side by side along a first direction. A state in which the second AGV cannot perform the second loading sub-task and waits may be maintained for a preset duration depending on the case. In this case, the first loading sub-task of the first AGV may be exchanged with the second loading sub-task of the second AGV to prevent or reduce instances of an unnecessary waiting state of the second AGV, which is described below in more detail with reference to FIGS. 3 and 4.

Figure 3:
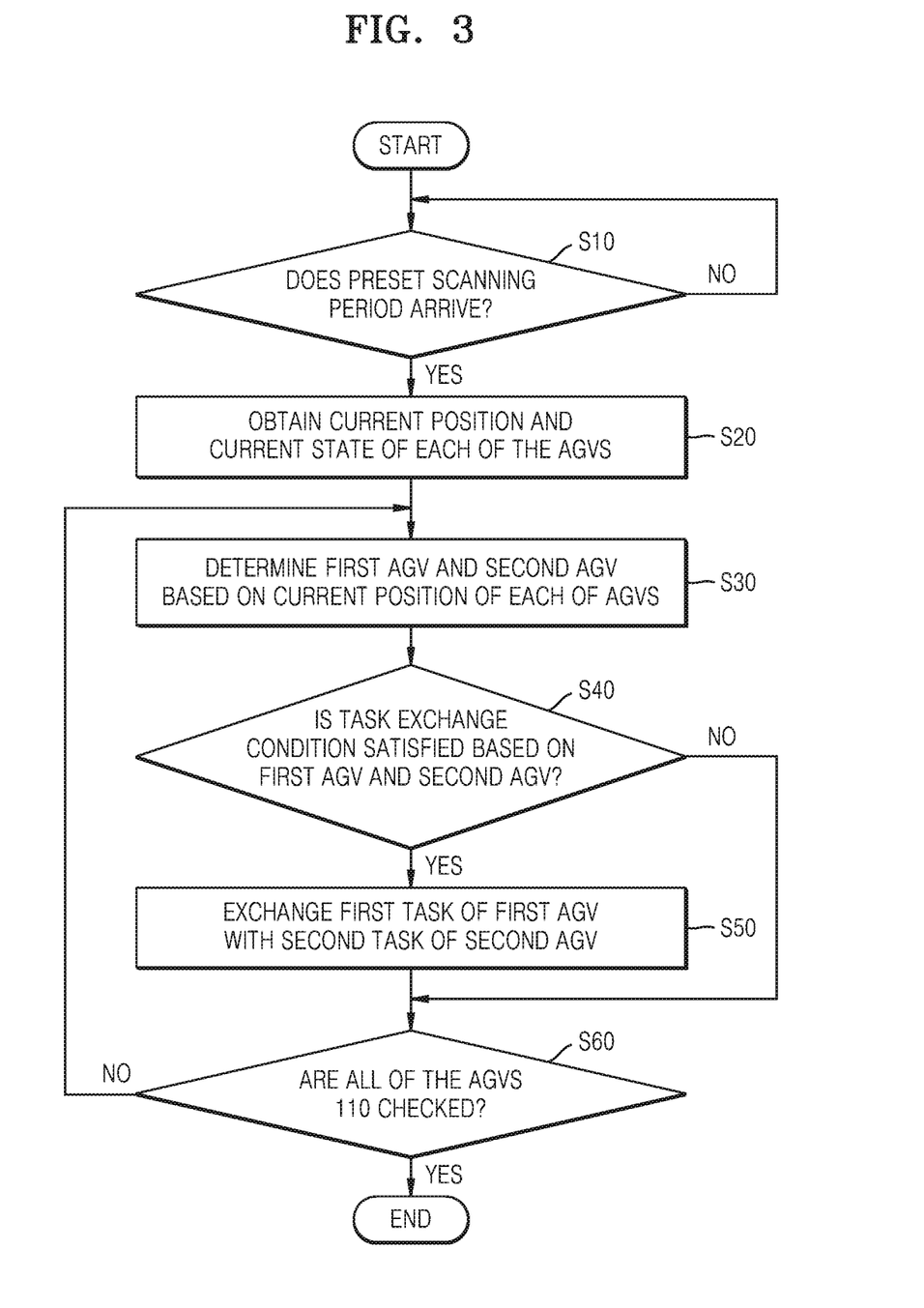
FIG. 3 is a flowchart of an automated guided vehicle driving method according to some embodiments.
Figure 4:
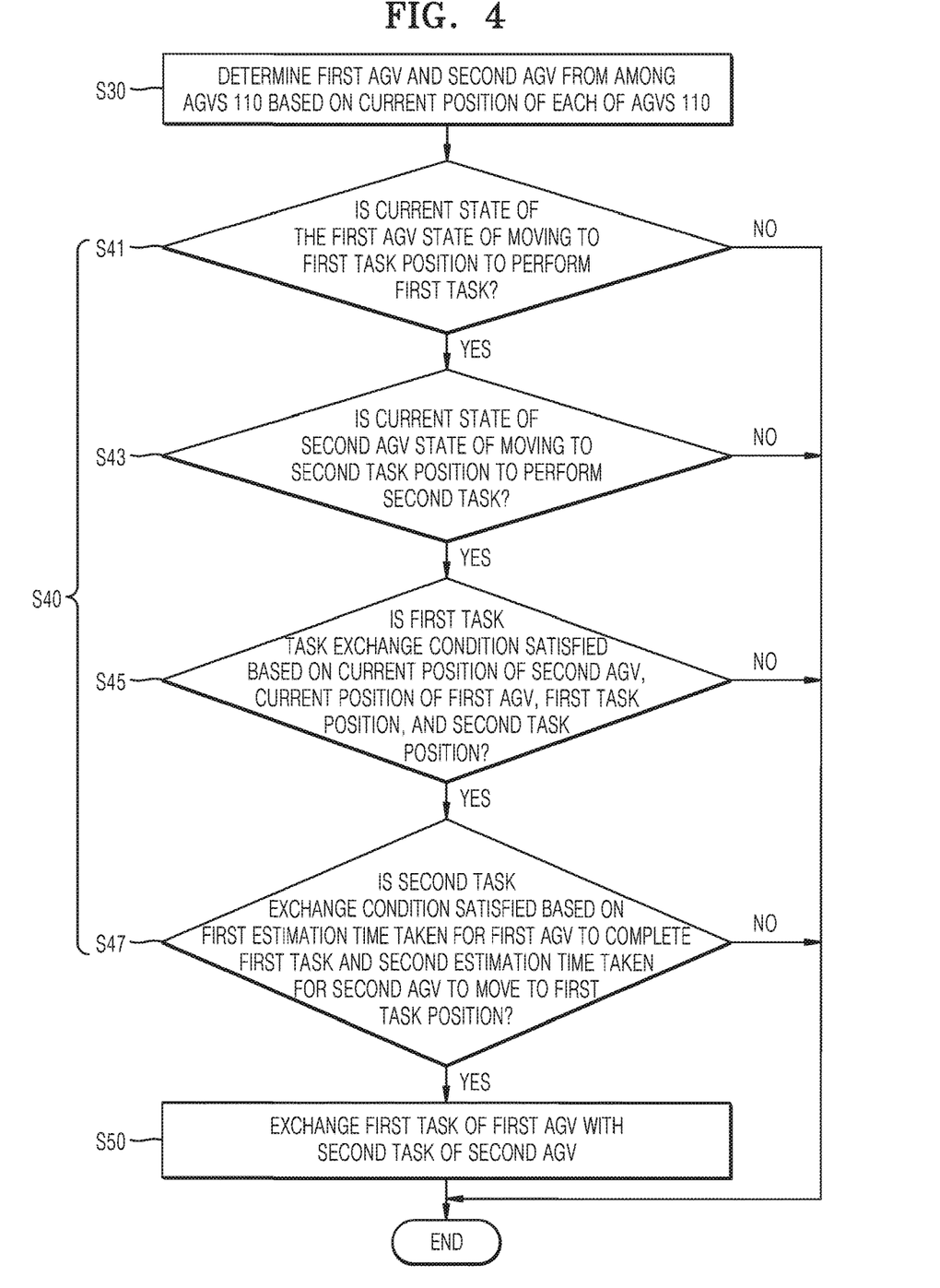
FIG. 4 is a flowchart of an automated guided vehicle driving method according to some embodiments.

FIGS. 3 and 4 are flowcharts showing an automated guided vehicle driving method according to some embodiments. According to some embodiments, the number and order of operations illustrated and described (e.g., with respect to FIGS>3-5) may vary, and according to some embodiments, there may be additional operations or fewer operations, or the order of operations may vary, without departing from the spirit and scope of embodiments according to the present disclosure.

The automated guided vehicle driving method according to some embodiments may be performed through or controlled by the server 100 of FIG. 1. According to some embodiments, a plurality of servers 100 or other computer systems may be incorporated into the automated guided vehicle driving method and system, and the plurality of servers 100 or other computer systems may operate in coordination and in communication with each other to perform the operations described herein. According to some embodiments, at least some operations of the automated guided vehicle driving method may be performed by a controller inside the server 100 or a controller inside the AGV 110.

Referring to FIG. 3, first, whether a preset scanning period arrives may be determined (S10). When the preset scanning period arrives, a current position and a current state of each of the AGVs 110 may be obtained (S20). When the preset scanning period does not arrive, whether the preset scanning period arrives may be determined again (S10). According to some embodiments, operation S10 of determining whether a preset scanning period arrives may be omitted.

In the present specification, although a current position of each of the AGVs 110 is used as a term denoting a geographical position at which each of the AGVs 110 is currently positioned, the current position may be understood as concept including a node corresponding to a current position of each of the AGVs 110. As an example, the obtaining of the current position of each of the AGVs 110 may mean obtaining a current geographical position of each of the AGVs 110 or mean obtaining a node corresponding to the current position. The node corresponding to the current position may mean a node closest to the current position or a node convenient to access from the current position.

As described above in FIG. 1, each of the AGVs 110 may receive codes including a task or driving information from the server 100 to operate inside the workplace 20. In this case, the task may include a movement sub-task, a loading sub-task, and an unloading sub-task. The movement sub-task may be a task for moving to perform the loading sub-task, the loading sub-task may be a task for loading a material, etc, and the unloading sub-task may be a task for moving to unload a material, etc. or unlading a material, etc.

The current state of the AGV 110 may be changed depending on a progression state of the task. As an example, in the case where the movement sub-task is performed, the current state of the AGV 110 may be a state of moving to a first sub-task position (e.g., a loading station or a node corresponding to the loading station) to perform the loading sub-task. In the case where the loading sub-task is performed, the current state of the AGV 110 may be a state in which the AGV 110 arrives at the first sub-task position and loads a material, etc. In the case where the unloading sub-task is performed, the current state of the AGV 110 is a state in which the AGV 110 that loads a material, etc. and moves to a second sub-task position (e.g., an unloading station or a node corresponding to the unloading station), or arrives at the second sub-task position to unload the material, etc. In the case where the AGV 110 completes the task or the task is not assigned to the AGV 110, the current state of the AGV 110 may be an idle state.

After the current position and the current state of each of the AGVs 110 are obtained (S20), a first AGV and a second AGV may be determined from among the AGVs 110 based on the current position of each of the AGVs 110 (S30).

According to some embodiments, the first AGV, which is one of the AGVs 110, is determined, and then the second AGV that is closest to the first AGV may be determined from among the AGVs 110 based on the current position of each of the AGVs 110. Here, that the second AGV is closest to the first AGV may mean that a distance between the current position of the second AGV of the AVGs 110 and the current position of the first AGV is shortest.

As an example, a distance between the first AGV and the second AGV may mean a shortest distance between the first AGV and the second AGV. As another example, a distance between the first AGV and the second AGV may mean a distance along the first path P1 shown in FIG. 1.

The first AGV and the second AGV are determined from among the AGVs 110 (S30), and then whether a task exchange condition is satisfied may be determined based on the first AGV and the second AGV (S40). In the case where the task exchange condition is satisfied, a first task of the first AGV may be exchanged with a second task of the second AGV (S50). That is, the second task may be assigned to the first AGV, and the first task may be assigned to the second AGV. In contrast, when the task exchange condition is not satisfied, the first AGV performs the first task as it is, and the second AGV performs the second task as it is.

Here, the first task of the first AGV and the second task of the second AGV may respectively correspond to the above-described loading sub-tasks. As an example, the first task of the first AGV and the second task of the second AGV may respectively be tasks of loading a material, etc.

Referring to FIG. 4, according to some embodiments, determining whether or not a task exchange condition is satisfied based on the first AGV and the second AGV (S40) may include determining whether or not a current state of the first AGV is a state of moving to the first task position to perform the first task (S41), determining whether or not a current state of the second AGV is a state of moving to the second task position to perform the second task (S43), determining whether or not the first task exchange condition is satisfied based on a current position of the second AGV, a current position of the first AGV, the first task position, and the second task position (S45), and determining whether a second task exchange condition is satisfied based on a first estimation time taken for the first AGV to complete the first task and a second estimation time taken for the second AGV to move to the first task position (S47).

That the task exchange condition is satisfied refers to the current state of the first AGV being a state of moving to the first task position to perform the first task, the current state of the second AGV being a state of moving to the second task position to perform the second task, and the first task exchange condition and the second task exchange condition being satisfied. In contrast, when any of the conditions included in the task exchange condition is not satisfied, it may be understood that the task exchange condition is not satisfied. In this case, because the task exchange condition is not established, the first AGV performs the first task as it is, and the second AGV performs the second task as it is.

First, whether or not a current state of the first AGV is a state of moving to the first task position to perform the first task may be determined (S41), and whether or not a current state of the second AGV is a state of moving to the second task position to perform the second task may be determined (S43).

Because the first task of the first AGV may correspond to the loading sub-task, the first AGV moving to the first task position to perform the first task may be understood as the first AGV performing the movement sub-task. In addition, because the second task of the second AGV may correspond to the loading sub-task, the second AGV moving to the second task position to perform the second task may be understood as the second AGV performing the movement sub-task.

Because the first task of the first AGV may correspond to the loading sub-task, the first task position for performing the first task may correspond to a loading station or a node corresponding to the loading station. In addition, because the second task of the second AGV may correspond to the loading sub-task, the second task position for performing the second task may correspond to a loading station or a node corresponding to the loading station.

When the current state of the first AGV is a state of moving to the first task position to perform the first task and the current state of the second AGV is a state of moving to the second task position to perform the second task, whether the first task exchange condition is satisfied may be determined based on the current position of the second AGV, the current position of the first AGV, the first task position, and the second task position (S45).

According to some embodiments, the first task exchange condition may be configured in an order of the current position of the second AGV, the current position of the first AGV, the first task position, and the second task position on the first path P1 (see FIG. 1). In the case where an order of the current position of the second AGV, the current position of the first AGV, the first task position, and the second task position on the first path P1 is configured, the first task exchange condition may be satisfied.

In other words, the first task exchange condition may be configured in the order of the current position of the second AGV, the current position of the first AGV, the first task position, and the second task position in a first direction. When the order of the current position of the second AGV, the current position of the first AGV, the first task position, and the second task position in the first direction is configured, the first task exchange condition may be satisfied. In this case, the first direction may include a clockwise direction, a counterclockwise direction, a linear direction, and a curved direction.

The current position of the first AGV and the current position of the second AGV that are used in determining whether or not the first task exchange condition is satisfied may be obtained together in operation S20 of obtaining the current position and the current state of each of the AGVs 110.

When the first task exchange condition is satisfied, because the order of the current position of the second AGV, the current position of the first AGV, the first task position, and the second task position on the first path P1 (or in the first direction) is configured, a waiting time of the second AGV may unnecessarily or undesirably occur. As an example, while the second AGV moves to the second task position to perform the second task, the second AGV may meet the first AGV that performs the first task at the first task position, and may be maintained in a standby state for a preset duration.

In this case, when the first task of the first AGV is exchanged with the second task of the second AGV, because the second AGV moves to the first task position to perform the first task, and the first AGV moves to the second task position to perform the second task, the second AGV may not be maintained in a standby state for a preset duration. Thus, the amount of time taken for performing the first task and the second task may be reduced.

When the first task exchange condition is satisfied, whether the second task exchange condition is satisfied may be determined based on the first estimation time taken for the first AGV to complete the first task and the second estimation time taken for the second AGV to move to the first task position (S47).

Here, the first estimation time may be a sum of a third estimation time taken for the first AGV to move to the first task position and a fourth estimation time taken for the first AGV to perform the first task. In other words, the first estimation time may be a time taken for the first AGV to move to the first task position and perform and complete the first task.

According to some embodiments, in the second task exchange condition, the first estimation time may be greater than the second estimation time. When the first estimation time is greater than the second estimation time, the second task exchange condition may be satisfied.

When the second task exchange condition is satisfied, an undesirable waiting time of the second AGV may unnecessarily or undesirably occur. As an example, while the second AGV moves to the second task position to perform the second task, the second AGV may meet the first AGV that performs the first task at the first task position, and the second AGV may be maintained in a standby state for a duration in which the second estimation time is subtracted from the first estimation time.

As described above, when the first task exchange condition and the second task exchange condition are satisfied, the second AGV may be maintained in a standby state for a preset duration, and the second task of the second AGV may not be swiftly performed.

In this case, when the first task of the first AGV is exchanged with the second task of the second AGV, because the second AGV moves to the first task position to perform the first task, and the first AGV moves to the second task position to perform the second task, the second task of the first AGV and the first task of the second AGV may be swiftly performed. The performance time of each of the first task and the second task may be reduced.

Though it is shown in FIG. 4 that, when the first task exchange condition is satisfied, whether the second task exchange condition is satisfied is determined, whether the second task exchange condition is established may be determined first, and then whether or not the first task exchange condition is established may be determined according to some embodiments. According to some embodiments, whether or not the first task exchange condition is established and whether or not the second task exchange condition is established may be simultaneously (or concurrently) determined.

Referring to FIG. 3, whether or not to exchange the first task of the first AGV with the second task of the second AGV may be determined, and then, whether or not all of the AGVs 110 are checked may be determined (S60). When the task exchange condition is not checked for all of the AGVs 110, operation S30 of determining the first AGV and the second AGV from among the AGVs 110 that are not checked may be performed again.

Figure 5:
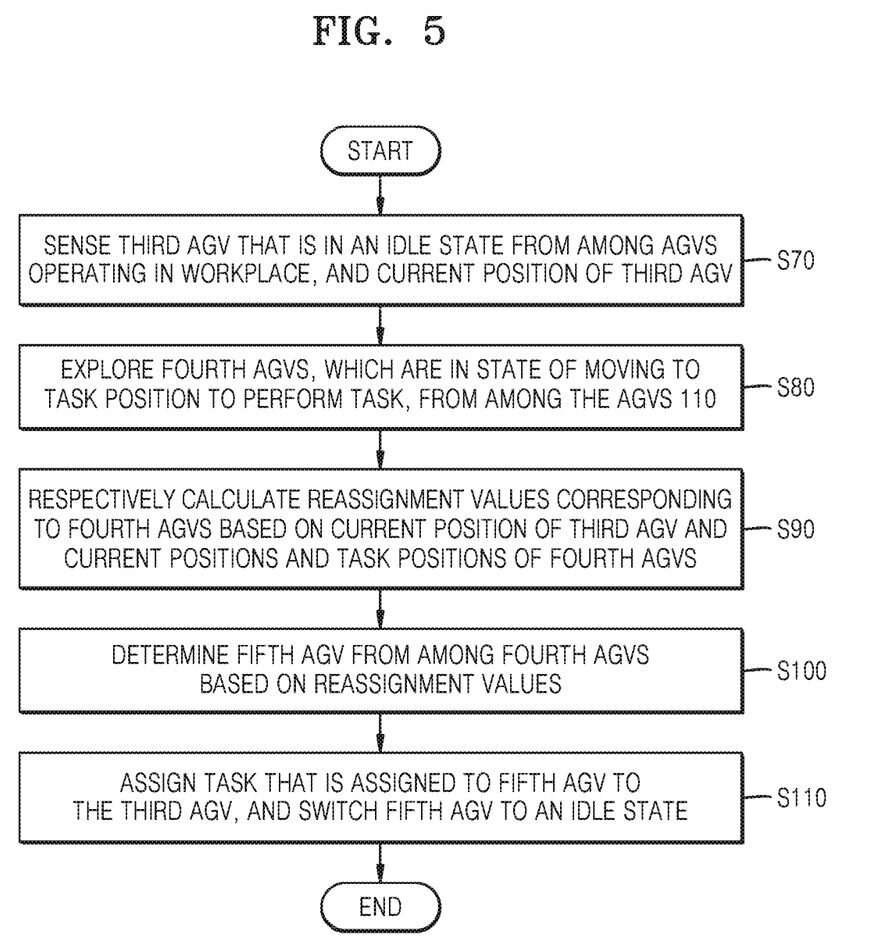
FIG. 5 is a flowchart of an automated guided vehicle driving method according to some embodiments.
Figure 6:
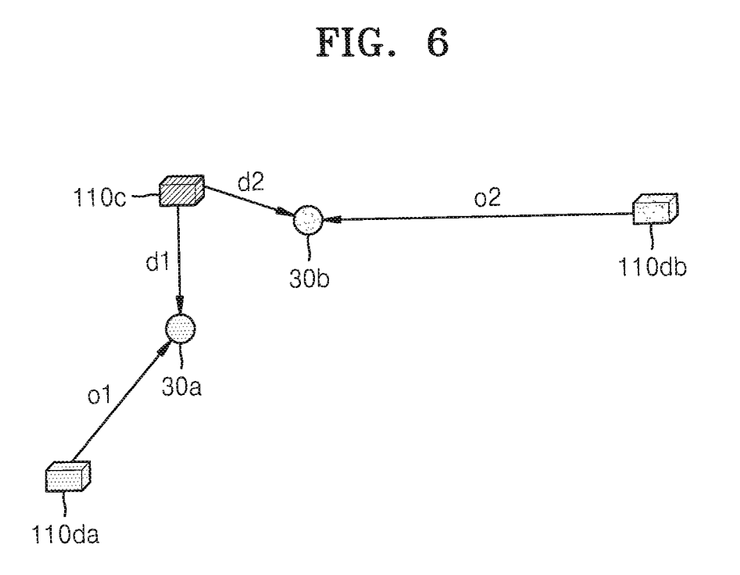
FIG. 6 is a view showing an example for explaining the automated guided vehicle driving method of FIG. 5.

FIG. 5 is a flowchart showing an automated guided vehicle driving method according to some embodiments, and FIG. 6 is a view showing an example for explaining the automated guided vehicle driving method of FIG. 5.

The automated guided vehicle driving method according to some embodiments may be performed through the server 100 of FIG. 0.1. According to some embodiments, at least some operations of the automated guided vehicle driving method may be performed by a controller inside the server 100 or a controller inside the AGV 110.

Referring to FIG. 5, a third AGV that is in an idle state from among the AGVs 110 operating in the workplace 20 (see FIG. 1), and a current position of the third AGV may be sensed first (S70). Fourth AGVs, which are in a state of moving to a task position to perform a task, may be explored from among the AGVs 110 (S80).

Here, the task may correspond to the loading sub-task described in FIG. 3. Because the task may correspond to the loading sub-task, moving to the task position to perform the task may be understood as performing the movement sub-task described in FIG. 3. In addition, a task position at which a task is performed may correspond to a loading station or a node corresponding to the loading station.

Although it is shown in FIG. 5 that the third AGV and the current position of the third AGV are sensed, and then, the fourth AGVs are explored, operation S70 of sensing the third AGV and the current position of the third AGV and operation S80 of exploring the fourth AGVs may be simultaneously performed according to some embodiments. According to some embodiments, the fourth AGVs are explored, and then, the third AGV and the current position of the third AGV may be sensed.

Next, reassignment values corresponding to the fourth AGVs may be respectively calculated based on the current position of the third AGV and the current positions and task positions of the fourth AGVs (S90).

According to some embodiments, each of the reassignment values may be a difference between a first separation distance and a second separation distance, the first separation distance being between a task position and a current position of one of the fourth AGVs, and the second separation distance being between the task position of the one of the fourth AGVs and a current position of the third AGV. In addition, the reassignment values may be positive numbers.

Calculation of the reassignment values is described by using a third AGV 110$c$, a $(4-1)^{st}$ AGV 110$da$, and a $(4-2)^{nd}$ AGV 110$db$ shown in FIG. 6. The third AGV 100$c$ is in an idle state, the $(4-1)^{st}$ AGV 110$ad$ is a state of moving to a first task position 30$a$ to perform a first task, and the $(4-2)^{nd}$ AGV 110$db$ is in a state of moving to a second task position 30$b$ to perform a second task.

A first reassignment value for the $(4-1)^{st}$ AGV 110$ad$ among the reassignment values may be calculated as a difference o1–d1 between a $(1-1)^{st}$ separation distance o1 and a $(2-1)^{st}$ separation distance d1, the $(1-1)^{st}$ separation distance o1 being between the first task position 30$a$ and a current position of the $(4-1)^{st}$ AGV 110$ad$, and the $(2-1)^{st}$ separation distance d1 being between the first task position 30$a$ and a current position of the third AGV 110$c$. Here, the first reassignment value is a positive number (o1–d1>0).

A second reassignment value for the $(4-2)^{nd}$ AGV 110$db$ among the reassignment values may be calculated as a difference o2–d2 between a $(1-2)^{nd}$ separation distance o2 and a $(2-2)^{nd}$ separation distance d2, the $(1-2)^{nd}$ separation distance o2 being between the second task position 30$b$ and a current position of the $(4-2)^{nd}$ AGV 110$db$, and the $(2-2)^{nd}$ separation distance d2 being between the second task position 30$b$ and a current position of the third AGV 110$c$. Here, the second reassignment value is a positive number (o2–d2>0).

Referring to FIG. 5 again, reassignment values respectively corresponding to the fourth AGVs are calculated, and then, a fifth AGV may be determined from among the fourth AGVs based on the reassignment values (S100). After the fifth AGV is determined, the task that is assigned to the fifth AGV may be assigned to the third AGV, and the fifth AGV may be switched to an idle state (S110).

According to some embodiments, an assignment value corresponding to the fifth AGV among the reassignment values may correspond to a maximum value among the reassignment values. In other words, one of the fourth AGVs that has a maximum reassignment value may be determined as the fifth AGV.

As an example, as shown in FIG. 6, when the second reassignment value o2–d2 corresponding to the $(4-2)^{nd}$ AGV 110$db$ is greater than the first reassignment value o1–d1 corresponding to the $(4-1)^{st}$ AGV 110$da$, the $(4-2)^{nd}$ AGV 110$db$ may be determined as the fifth AGV. In addition, the second task that is assigned to the $(4-2)^{nd}$ AGV 110*db* is assigned to the third AGV 110*c*, and the (4-2)$^{nd}$ AGV 110*db* may be switched to an idle state.

As described above, when the third AGV that is switched to an idle state is closer to the second task position 30*b* than the (4-2)$^{nd}$ AGV 110*db*, the second task of the (4-2)$^{nd}$ AGV 110*db* is reassigned to the third AGV 110*c*, and thus, a performance time of the second task may be reduced.

A method of driving the AGV in FIGS. 3 and 4 and a method of driving the AGV in FIG. 5 may be performed independently. Alternatively, a method of driving the AGV in FIGS. 3 and 4 and a method of driving the AGV in FIG. 5 may be performed simultaneously. Alternatively, a method of driving the AGV in FIGS. 3 and 4 and a method of driving the AGV in FIG. 5 may be performed in combination.

FIG. 7 is a view for explaining the automated guided vehicle driving method of FIGS. 3 to 5.

An example in which a method of driving the AGV in FIGS. 3 and 4 and a method of driving the AGV in FIG. 5 are performed in combination is described with reference to FIG. 7.

Figure 7A:
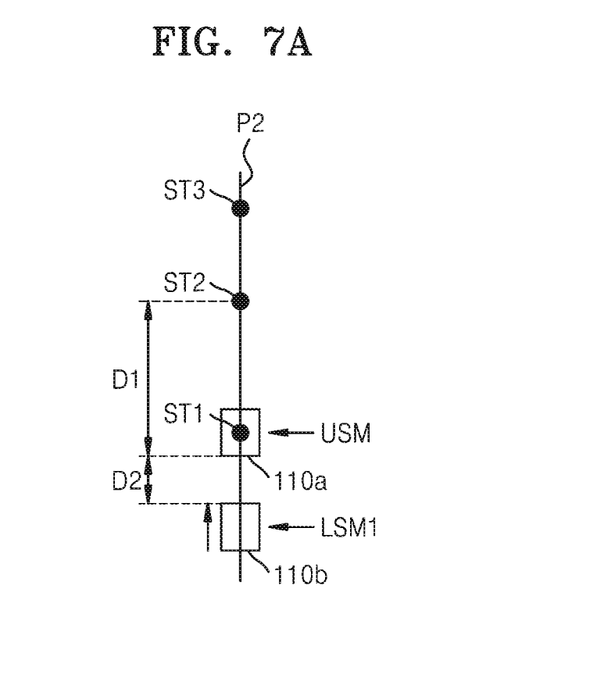
FIGS. 7A-7D are views for explaining the automated guided vehicle driving method of FIGS. 3 to 5.

First, referring to FIG. 7A, because the first AGV 110*a* performs an unloading sub-task USM at a first station ST1, a first loading sub-task LSM1 may be assigned to the second AGV 110*b* that is in an idle state. Here, the first loading sub-task LSM1 corresponds to a task of loading a material, etc. at a second station ST2.

When the first AGV 110*a* completes an unloading sub-task USM and becomes an idle state, whether to reassign the first loading sub-task LSM1 may be determined according to the automated guide vehicle driving method of FIG. 5.

As an example, the first AGV 110*a* that is in an idle state and a current position of the first AGV 110*a* may be sensed, and the second AGV 110*b* that is in a state of moving to the second station ST2 to perform the first loading sub-task LSM1 may be explored.

Next, a reassignment value corresponding to the second AGV 110*b* may be calculated. The reassignment value corresponding to the second AGV 110*b* may be calculated based on a current position of the first AGV 110*a*, the current position of the second AGV 110*b*, and the position of the second station ST2. The reassignment value corresponding to the second AGV 110*b* may be calculated as a difference D2 (or greater than D2) between a first separation distance D1+D2 and a second separation distance D1 (or less than D1), the first separation distance D1+D2 being between a current position of the second station ST2 and a current position of the second AGV 110*b*, and the second separation distance D1 being between a position of the second station ST2 and a current position of the first AGV 110*a*.

Figure 7B:
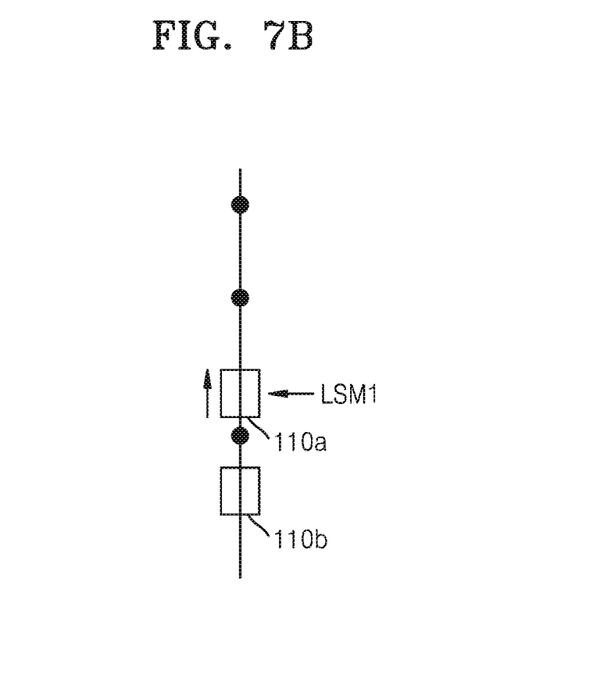

In this case, because a reassignment value corresponding to the second AGV 110*b* satisfies a positive number and there is no reassignment value corresponding to another AGV to be compared to a reassignment value corresponding to the second AGV 110*b* in FIG. 7A, the first loading sub-task LSM1 that is assigned to the second AGV 110*b* may be reassigned to the first AGV 110*a* as shown in FIG. 7B. As a result, the second AGV 110*b* may be switched to an idle state.

Figure 7C:
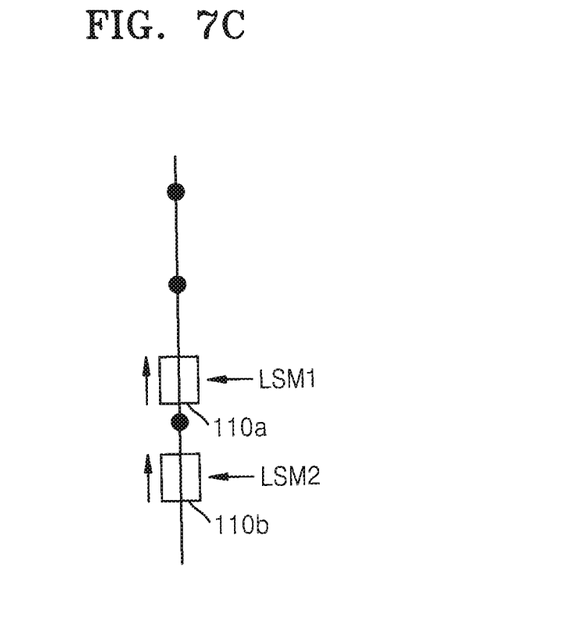

Referring to FIG. 7C, a second loading sub-task LSM2 may be assigned to the second AGV 110*b* that is in an idle state. Here, the second loading sub-task LSM2 corresponds to a task of loading a material, etc. at a third station ST3.

When the first loading sub-task LSM1 is assigned to the first AGV 110*a*, and the second loading sub-task LSM2 is assigned to the second AGV 110*b*, whether to exchange the first loading sub-task LSM1 of the first AGV 110*a* with the second loading sub-task LSM2 of the second AGV 110*b* may be determined according to the automated guided vehicle driving method of FIGS. 3 and 4.

As an example, the first AGV 110*a* and the second AGV 110*b* may be AGVs determined close to each other from among the AGVs. In addition, because the current state of the first AGV 110*a* is a state of moving to the second station ST2 to perform the first loading sub-task LSM1, and the current state of the second AGV 110*b* is a state of moving to the third station ST3 to perform the second loading sub-task LSM2, whether the first task exchange condition and the second task exchange condition are satisfied may be determined.

First, the first task exchange condition is determined. Because an order of the current position of the second AGV 110*b*, the current position of the first AGV 110*a*, the position of the second station ST2, and the position of the third station ST3 on a second path P2 is configured, the first task exchange condition is satisfied.

Next, the second task exchange condition may be determined. That is, whether the first estimation time taken for the first AGV 110*a* to complete the first loading sub-task LSM1 is greater than the second estimation time taken for the second AGV 110*b* to move the second station ST2 may be determined. Here, the first estimation time may be a sum of the third estimation time taken for the first AGV 110*a* to move to the second station ST2 and the fourth estimation time taken for the first AGV 110*a* to load a material, etc.

According to some embodiments, the second task exchange condition may be determined based on a separation distance D2 between the first AGV 110*a* and the second AGV 110*b*. As an example, the separation distance D2 between the first AGV 110*a* and the second AGV 110*b* may be compared with a value of the fourth estimation time taken for the first AGV 110*a* to load a material, etc. multiplied by the velocity (e.g., an average velocity) of the AGV.

When the separation distance D2 between the first AGV 110*a* and the second AGV 110*b* is less than the value of the fourth estimation time taken for the first AGV 110*a* to load a material, etc. multiplied by the velocity (e.g., an average velocity) of the AGV, the second task exchange condition may be satisfied.

Figure 7D:
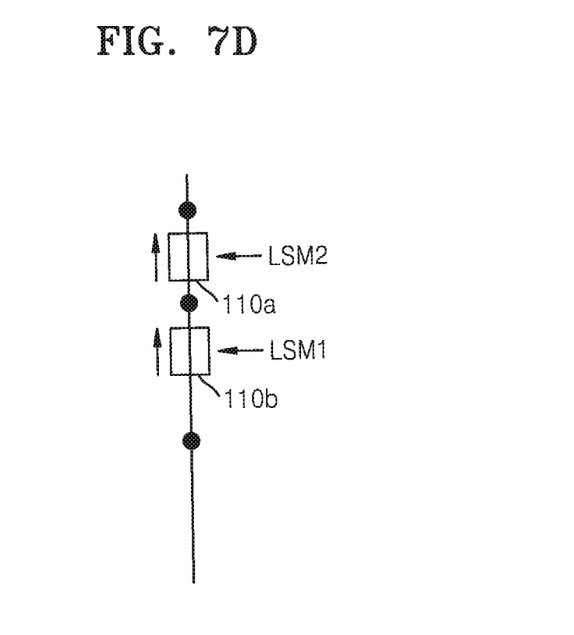

When the second task exchange condition is satisfied, as shown in FIG. 7D, the first loading sub-task LSM1 of the first AGV 110*a* may be exchanged with the second loading sub-task LSM2 of the second AGV 110*b*. That is, the second loading sub-task LSM2 may be reassigned to the first AGV 110*a*, and the first loading sub-task LSM1 may be reassigned to the second AGV 110*b*.

As described above, when the loading sub-tasks are reassigned according to the automated guided vehicle driving method of FIGS. 3 and 4, because the first AGV 110*a* moves to the third station ST3 to perform the second loading sub-task LSM2, and the second AGV 110*b* moves to the second station ST2 to perform the first loading sub-task LSM1, a waiting time of the second AGV 110*b* does not unnecessarily occur. Accordingly, the first AGV 110*a* and the second AGV 110*b* may perform the loading sub-tasks swiftly without a delay, respectively.

According to some embodiments, when a task exchange condition is satisfied, because tasks respectively assigned to the AGVs are exchanged, the amount of time taken for a task assigned to each of the AGVs to be performed may be relatively reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A method of controlling driving of a first automated guided vehicle and a second automated guided vehicle each operating in a workplace, the method comprising:
    obtaining a current position and a current state of each of the first automated guided vehicle and the second automated guided vehicle;
    determining whether or not the current state of the first automated guided vehicle is a state of moving to a first task position to perform a first task and whether or not the current state of the second automated guided vehicle is a state of moving to a second task position to perform a second task;
    determining a first task exchange condition based on the current position of the second automated guided vehicle, the current position of the first automated guided vehicle, the first task position, and the second task position, wherein the first task exchange condition is deemed to be satisfied in response to determining an ordering of the current position of the second automated guided vehicle, the current position of the first automated guided vehicle, the first task position, and the second task position, to be in a first direction;
    determining a second task exchange condition based on a first estimation time taken for the first automated guided vehicle to complete the first task and a second estimation time taken for the second automated guided vehicle to move to the first task position, wherein the second task exchange condition is deemed to be satisfied in response to the first estimation time being greater than the second estimation time;
    in response to the first task exchange condition and the second task exchange condition being satisfied, exchanging the first task of the first automated guided vehicle with the second task of the second automated guided vehicle; and
    transmitting a signal to the first automated guided vehicle, wherein in response to the signal the first automated guided vehicle moves to the second task position for executing the second task.

2. The method of claim 1, wherein the first direction is along a first path.

3. The method of claim 1, wherein the first estimation time is a sum of a third estimation time taken for the first automated guided vehicle to move to the first task position and a fourth estimation time taken for the first automated guided vehicle to perform the first task.

4. The method of claim 1, further comprising:
    obtaining a current position of each of a plurality of automated guided vehicles operating in the workplace; and
    determining the first automated guided vehicle and the second automated guided vehicle from among the plurality of automated guided vehicles based on the current position of each of the plurality of automated guided vehicles.

5. The method of claim 4, wherein determining the first automated guided vehicle and the second automated guided vehicle from among the plurality of automated guided vehicles includes:
    determining the first automated guided vehicle from among the plurality of automated guided vehicles; and
    identifying one of the plurality of automated guided vehicles that is closest to the first automated guided vehicle as the second automated guided vehicle, based on the current position of each of the plurality of automated guided vehicles.

6. The method of claim 1, further comprising:
    sensing a third automated guided vehicle that is in an idle state from among a plurality of automated guided vehicles operating in the workplace and a current position of the third automated guided vehicle;
    searching for fourth automated guided vehicles that are in a state of moving to a task position to perform a task from among the plurality of automated guided vehicles;
    respectively calculating reassignment values respectively corresponding to the fourth automated guided vehicles based on the current position of the third automated guided vehicle and a current position and a task position of each of the fourth automated guided vehicles;
    determining a fifth automated guided vehicle from among the fourth automated guided vehicles based on the reassignment values; and
    assigning a third task that has been assigned to the fifth automated guided vehicle to the third automated guided vehicle, and switching the fifth automated guided vehicle to an idle state.

7. The method of claim 6, wherein each of the reassignment values is a difference between a first separation distance and a second separation distance, the first separation distance being between a task position and a current position of one of the fourth automated guided vehicles, and the second separation distance being between the task position of one of the fourth automated guided vehicles and the current position of the third automated guided vehicle.

8. The method of claim 6, wherein the reassignment values are positive numbers.

9. The method of claim 6, wherein a reassignment value for the fifth automated guided vehicle among the reassignment values corresponds to a maximum value of the reassignment values.

10. The method of claim 1, wherein obtaining the current position and the current state of each of the first automated guided vehicle and the second automated guided vehicle is performed at a preset scanning period.

11. A system for controlling driving of automated guided vehicles, the system comprising:
    a first automated guided vehicle and a second automated guided vehicle each operating in a workplace; and
    a server configured to control driving of each of the first automated guided vehicle and the second automated guided vehicle,
    wherein the server is configured to:
        obtain a current position and a current state of each of the first automated guided vehicle and the second automated guided vehicle;
        determine whether or not the current state of the first automated guided vehicle is a state of moving to a first task position to perform a first task and whether or not the current state of the second automated guided vehicle is a state of moving to a second task position to perform a second task;
        determine a first task exchange condition based on the current position of the second automated guided vehicle, the current position of the first automated guided vehicle, the first task position, and the second task position, wherein the first task exchange condition is deemed to be satisfied in response to determining an ordering of the current position of the second automated guided vehicle, the current position of the first automated guided vehicle, the first task position, and the second task position, to be in a first direction;

determine a second task exchange condition based on a first estimation time taken for the first automated guided vehicle to complete the first task and a second estimation time taken for the second automated guided vehicle to move to the first task position, wherein the second task exchange condition is deemed to be satisfied in response to the first estimation time being greater than the second estimation time;

in response to the first task exchange condition and the second task exchange condition being satisfied, exchange the first task of the first automated guided vehicle with the second task of the second automated guided vehicle; and transmit a signal to the first automated guided vehicle, wherein in response to the signal the first automated guided vehicle is configured to move to the second task position for executing the second task.

12. The system of claim 11, wherein the first direction is along a first path.

13. The system of claim 12, further comprising a plurality of nodes forming the first path.

14. The system of claim 12, further comprising a driving guidance line extending along the first path.

15. The system of claim 11, wherein the server is configured to:
obtain a current position of each of a plurality of automated guided vehicles operating in the workplace; and
identify the first automated guided vehicle and the second automated guided vehicle from among the plurality of automated guided vehicles based on the current position of each of the plurality of automated guided vehicles.

16. The system of claim 11, wherein the server is configured to:
sense a third automated guided vehicle that is in an idle state from among a plurality of automated guided vehicles operating in the workplace and a current position of the third automated guided vehicle;
search for fourth automated guided vehicles that are in a state of moving to a task position to perform a task from among the plurality of automated guided vehicles;
calculate reassignment values respectively corresponding to the fourth automated guided vehicles based on the current position of the third automated guided vehicle and a current position and a task position of each of the fourth automated guided vehicles;
determine a fifth automated guided vehicle from among the fourth automated guided vehicles based on the reassignment values; and
assign a third task that has been assigned to the fifth automated guided vehicle to the third automated guided vehicle, and switch the fifth automated guided vehicle to an idle state.

17. The system of claim 16, wherein each of the reassignment values is a difference between a first separation distance and a second separation distance, the first separation distance being between a task position and a current position of one of the fourth automated guided vehicles, and the second separation distance being between the task position of one of the fourth automated guided vehicles and the current position of the third automated guided vehicle, and each of the reassignment values is a positive number.

18. The system of claim 16, wherein a reassignment value for the fifth automated guided vehicle among the reassignment values corresponds to a maximum value of the reassignment values.

* * * * *